United States Patent [19]

Edwards et al.

[11] Patent Number: 4,836,381
[45] Date of Patent: Jun. 6, 1989

[54] PATTERNED ART APPARATUS AND METHOD

[76] Inventors: James J. Edwards, 2139 W. Royalton Rd., Broadview Heights, Ohio 44147; Richard C. Singerman, Jr., 10501 Halcyon Dr., Parma, Ohio 44130

[21] Appl. No.: 704,273

[22] Filed: Feb. 22, 1985

[51] Int. Cl.[4] .............................................. B65D 69/00
[52] U.S. Cl. ................................... 206/575; 206/1.7; 434/81; 434/84; 434/96; 434/98
[58] Field of Search ................. 206/1.7, 1.8, 574, 575; 434/81, 84, 95, 96, 97, 98; D18/15

[56] References Cited

U.S. PATENT DOCUMENTS

| | | | |
|---|---|---|---|
| Re. 25,031 | 8/1961 | Hoolim | 434/96 |
| 586,795 | 7/1897 | Jones | 434/81 |
| 1,562,225 | 11/1925 | Garman | 434/81 |
| 1,893,944 | 1/1933 | Johnson | 434/96 |
| 2,038,516 | 4/1936 | McIntosh | 434/84 |
| 2,386,418 | 10/1945 | Armbrust | 434/84 |
| 3,002,309 | 10/1961 | Snyder | 434/96 |
| 3,380,380 | 4/1968 | Funahashi | D18/15 |
| 3,433,485 | 3/1969 | Renn et al. | 434/84 |
| 3,574,017 | 4/1971 | Kass | 434/81 |
| 3,581,882 | 6/1971 | Bish | 206/1.7 |
| 3,597,099 | 8/1971 | Tollin | 434/81 |
| 3,756,153 | 9/1973 | Cohen | D18/15 |
| 3,758,695 | 9/1973 | Goodman et al. | 434/84 |
| 3,768,177 | 10/1973 | Thomas | 434/81 |
| 3,897,587 | 7/1975 | Molner | 206/575 |
| 3,976,807 | 8/1976 | Sweeney et al. | 434/81 |
| 4,073,070 | 2/1978 | Boston | 434/84 |
| 4,102,456 | 7/1978 | Morris | 206/575 |
| 4,355,722 | 10/1982 | Lemmeyer | 206/575 |
| 4,378,214 | 3/1983 | Scherer | 434/81 |
| 4,416,632 | 11/1983 | Berman | 206/575 |

FOREIGN PATENT DOCUMENTS 680173 10/1952 United Kingdom ................. 434/81

OTHER PUBLICATIONS

City Marking Devices Corp., 1/8/68, D18/15, pp. 1 & 2.
Industrial Art Text Books, Copyright 1915, by Snow et al.
Scientific American, Jan. 1977, by Gardner.

Primary Examiner—David T. Fidei
Attorney, Agent, or Firm—Renner, Otto, Boisselle & Sklar

[57] ABSTRACT

An apparatus/kit for making a composite picture on a surface medium preferably includes such surface medium and pad-like applicators to apply color media to the surface medium forming respective symbols thereon creating the composite picture. The applicators preferably are padlike, being formed of paint, or other color media, holding pads mounted on a support structure or backing; the pads preferably are resilient and absorbent or adsorbent. The invention also embodies a method for creating a composite picture on a surface medium using such pad-like applicators to apply color media in selected symbol-like designs to selected areas of the surface medium. Such application may be in a form of free expression by the user or may follow a prescribed pattern furnished as part of the apparatus/kit. A symbol design sheet may be included in the apparatus/kit to enable a user conveniently to select desired symbols for respective applicators, thus minimizing creativity and decision-making processes when the invention is used. Predesigned symbols with adhesive backing may be used as applicators to be stuck onto a surface medium to complete composite pictures without the need for paint.

21 Claims, 1 Drawing Sheet

U.S. Patent   Jun. 6, 1989   4,836,381
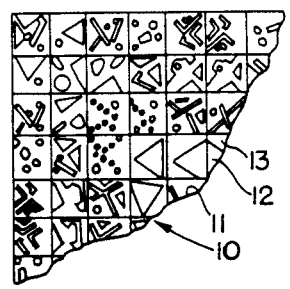
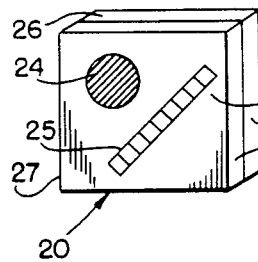
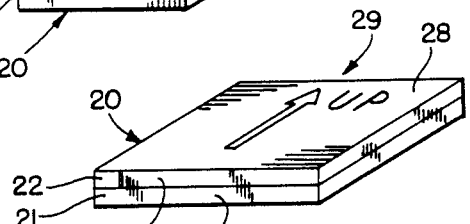
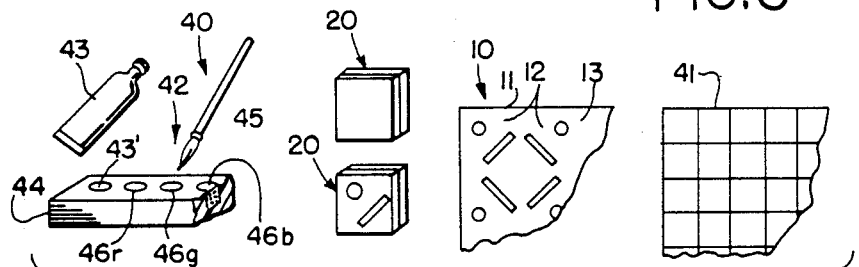
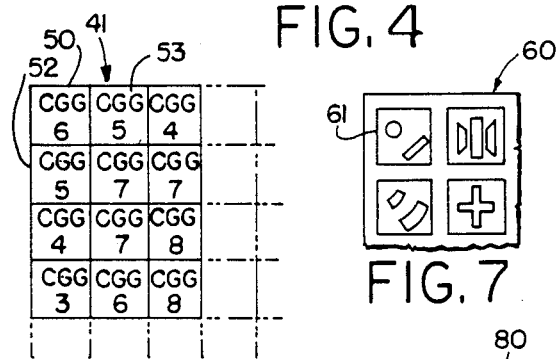
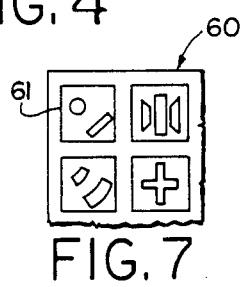
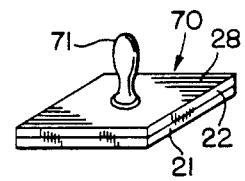
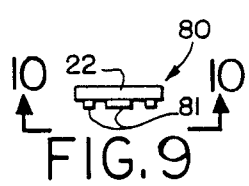
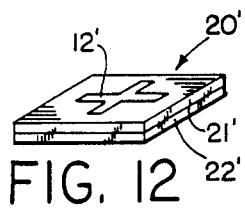
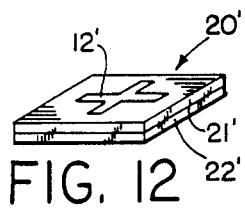

PATTERNED ART APPARATUS AND METHOD

TECHNICAL FIELD

The present invention relates generally, as is indicated, to a patterned art apparatus and method and, more particularly, to an apparatus/kit and method which employs pad-like applicators for applying color media to various surfaces to create works of art and as an educational tool.

BACKGROUND

Various techniques have been used in the past to apply color media onto a surface medium. One example is the use of a paintbrush to apply paint to a canvas, as an artist might do. Block printing is another example of a technique using carved or molded wood or metal blocks for applying color media to form characters on a surface medium.

In some cases an individual may wish to create an artistic work even though the individual may not have substantial artistic talent with a paintbrush. Paint-by-numbers types of painting kits have been developed. For young children paintbooks that use water-soluble color media printed on the pages are available; the child simply uses a paintbrush to apply water to the color media to "paint" the given area.

One problem with the paint-by-numbers approach is that the work often requires attention to intricate details and may try the patience of the user. Moreover, often the resulting work looks like a canned product and not free expression of the user/artist.

SUMMARY

In accordance with the present invention an aspiring or actual artist may conveniently create a work of art having practical and aesthetic value while accommodating levels of skill from the novice to the qualified artisan. The user may determine what level of creativity is to be employed according to the invention and the degree of intricacy of the final work.

Briefly, according to one aspect of the invention, a kit for making a composite picture includes a surface medium on which the composite picture is to be made and plural pad-like applicators for applying color media to the surface medium to form respective symbols thereon creating the composite picture. In one example the surface medium may be a canvas; the applicators may be of resilient material having surface area on which color medium (media) is (are) applied; and the applicator is pressed to engagement with a portion of the surface medium whereby the color medium (media) forms a symbol on such surface. The various symbols may be applied to the surface medium according to a specified pattern or according to a free expression format of the user/artist.

According to another aspect of the invention a method for creating a composite picture includes the providing of a surface medium on which the composite picture is to be composed and the using of pad-like applicators to apply color media to selected areas of the surface medium, for example according to a prescribed pattern or according to a free expression format. The color media is applied to the applicators and the applicators, then, are used to apply the color media to form symbols on respective portions of the surface medium.

These and other objects, aspects and advantages of the invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a fragmentary illustration of a composite picture made employing the present invention;

FIGS. 2 and 3 are respective bottom and side isometric views of a pad-like applicator according to the invention;

FIG. 4 is a schematic illustration of the apparatus employed in a kit according to the invention;

FIGS. 5 and 6 are fragmentary illustrations of respective pattern sheets used in the invention;

FIG. 7 is a fragmentary view of part of a symbol sheet used in the invention;

FIG. 8 is an isometric view of a modified pad-like applicator according to the invention;

FIGS. 9 and 10 are respective side and bottom views of a further modified pad-like applicator according to the invention;

FIG. 11 is an isometric view of a foam-like/sponge-like applicator pad with an adhesive backing for use in a pad-like applicator according to the invention; and FIG. 12 is an isometric view of a predesignated symbol-pad-applicator with adhesive backing to be applied to a patterned sheet according to the design method of this invention.

DESCRIPTION OF THE PREFERRED EMBODIMENTS

Referring now in detail to the drawings, wherein like reference numerals designate like parts in the several figures, and initially to FIG. 1, a work of art or picture made in accordance with the present invention is generally designated 10. The picture 10 is formed of a support medium 11 on which a plurality of symbols 12 have been applied. The symbols 12 preferably are applied to the surface 13 of the support medium according to a pattern or according to a form of free expression by the applying artist to form the picture 10 as a composite of the plurality of individual symbols applied thereto. In the preferred embodiment and best mode of the invention, the support medium 11 is a typical canvas or linen material on which oil paint ordinarily is applied by an artist. However, other suitable materials for the support medium 11 may include paper, cloth, silkscreen, wood, metal, concrete, and other natural and artificial materials upon which symbols 12 may be applied and retained thereon. Thus, the picture 10 is formed of a plurality of such symbols as a composite picture or work of art.

The surface 13 may be blank prior to application of the symbols 12, and a pattern sheet (FIGS. 5 and 6) may be used as a guide to show the artist an example of a pattern according to which selected symbols may be applied to the surface 13. As used herein the term "artist" or user means a person who would apply the symbols to the support medium without regard to the level of artistic skill of the particular individual. The support medium 11 alternatively may have pre-printed thereon a rectilinear grid to facilitate the aligning of individual symbols on the support medium, and, if desired, information ordinarily contained on a pattern sheet (FIGS. 5 and 6) may be printed faintly on the surface of the support medium 11 to facilitate identifying to the artist locations for application of specific symbols.

A pad-like applicator 20 illustrated in FIGS. 2 and 3 is a preferred tool for applying color media to the surface 13 of the support medium 11. Such applicator 20 includes an applying material 21 and a support backing material 22, the two preferably being attached or adhered to one another, e.g. using adhesive, glue, etc., to form an integral pad. The applying material 21 has a front applying surface 23 for retaining color media and from which color media, such as that identified as a circle at 24 and as a diagonal line at 25, may be applied as a symbol 12 to the surface 13. An exemplary applying material 21 may be a sponge or sponge-like material, a rubber, foam rubber, or like material, and/or other materials that have an applying surface 23 suitable for the indicated purpose, i.e. pad-applicator, and preferably also have a resilient characteristic to add a further control dimension in the application of color media during use of applicator 20 by the artist.

The applicator could be any vehicle for applying symbol representations on each specific designated area on the surface 13 of the support medium 11. The applicator 20 also may include pre-colored portions to help identify colors and/or portions to be used in forming a given symbol.

In the preferred embodiment and best mode of the invention, the applying material 21 is a sponge or foam rubber pad-like material having a reservoir capacity, i.e. it is able to store a quantity of the color media 24, 25 therein, while it is from the applying surface 23 at which the color media becomes available for application to the support medium 11 to form a symbol 12 thereon. In any event, it is preferred that the applying surface 23 and/or the nature of the applying material 21 be capable of some reservoir capacity for applying plural identical symbols to the support medium 11 without the need to refill or to reapply color media to the applicator 20.

For complex, complicated or detailed symbols, multiple pad/applicators may be required, each with the same designated symbol, and a respective one being used only once or for only a limited number of applications in order to maintain color separation or paint separation of the several parts of the symbol on the pad and as applied to the surface 13. Furthermore, modified predesignated symbol-pad-applicators 20' may be employed in the form of a sheet of material 21' having a symbol 12' preprinted thereon and an adhesive backing 22' used to attach such sheet to a prescribed area on the surface 13. Such sheet, then, achieves the same end as the painted on symbols applied to the surface 13 by an applicator 20, i.e. formation of composite pictures 10 formed of a plurality of symbols on surface 13 of support medium 11.

Also according to the preferred embodiment of the invention, the applying surface 23 is generally planar and substantially integral or whole. The shape of the one or more components of color media used to form a symbol 12 would be formed or defined according to the way in which such color media would be applied to the applying surface 23, for example by the artist using a paintbrush, paint tubes, spatula, or knife. Thus, for example, the artist may apply one color paint to a circular area identified at 24 in FIG. 2 and a different color paint to form the horizontal line 25 in FIG. 2. The symbol composed of the circle 24 and line 25, then, could be applied to the support medium 11 using the applicator 20 by pressing the applying surface 23 against the surface 13. After one or more applications of the given symbol formed on the applicator 20, such applicator could be reloaded or "buttered" with additional color media in the same arrangement of the components 24, 25 to form more similar symbols on the support medium 11. To form a different symbol than that employing the components 24, 25, either a different applicator may be used with different symbols components applied thereto or, depending on the nature of the color media, the original applicator 20 possibly may be washed clean of the original color media and usually after drying re-used by re-buttering the same with different symbol components to form a different symbol for application to the support medium 11.

The symbol on a given applicator can be modified to effectively change the original symbol to something different by addition of more color media to the applying surface. For example, a pad with a circle symbol later could be used to form a square by adding paint to the applying surface changing the symbol from a circle to a square.

The support backing 22 preferably is a relatively rigid material compared to the preferred more flexible resilient applying material 21, although, if desired, the support backing 22 may have a certain yieldability or flexibility. A preferred material of which the support backing 22 is formed would be cardboard, which is relatively light weight, strong, inexpensive and durable. The support backing 22 and applying material 21 preferably are secured together to form an integral applicator 20. Moreover, preferably the perimeter edges 26 of the support backing 22 are generally parallel and coextensive with the perimeter edges 27 of the applying material 21 with minimal and most preferably no overlap of the support backing beyond the perimeter 27 of the applying material 21. Avoiding such an overlap helps to avoid the possibility of color media accumulating on the overlapping material and inadvertently being applied to the support medium 11 during use of the pad-like applicator 20. The top surface 28 of the support backing 22, i.e. that surface remote from the surface to which the applying material 21 is fastened, may have one or more indicia thereon to identify direction or orientation of the pad-like applicator 20. The exemplary indicia 29 seen in FIG. 3 include an arrow and the word "UP".

Direction or orientation of a pad symbol effectively changes the presentation of the symbol as it makes up and contributes in the overall pattern design. Preferably only four directions are designated - up, down, right, and left. Other orientations are possible but care must always be given to keep the pad symbol within its designated area in the pattern or design.

Turning briefly to FIG. 4, several components of a kit apparatus generally designated 40 in accordance with the present invention for making patterned art work on support media 11 are illustrated. Such components may include one or more applicators 20, a support medium 11, a means to identify a pattern arrangement of symbols for application to the support medium 11, such means preferably taking the form of a pattern sheet 41 (described in greater detail below with reference to FIGS.

5 and 6), and color media 42. The applicator 20 and support medium 11 were described above. The color media 42 is illustrated as several tubes 43 of different respective color materials, such as oil pigment, acrylic, water color, ink, or similar color medium materials generally having a fluidic characteristic so they can be applied directly to and temporarily retained on or in an applicator 20 and can be applied by such applicator to form respective symbols 12 on the support medium 11. Alternatively, the color media may be furnished in a container 43' held in tray 44. A paintbrush 45, spatula, knife or other instrument may be used to deliver the color media from the tubes 43 or container 43' to the applying material 21 of respective applicators 20. Thus, for example, one container 43 may contain red paint 46r, another green paint 46g, and another blue paint 46b, etc. The color media may be only a single color, may be black ink or paint, etc., depending on the desired finished product of picture 10 (FIG. 1). Preferably the components of the apparatus/kit 40 are packaged together so that a user or artist easily can promptly use the same to compose a composite picture 10.

In FIGS. 5 and 6 representative portions of respective pattern sheets 41, 41' are illustrated. Each pattern sheet is laid out in a retilinear grid having plural individual areas or boxes 50, 50' intended to correspond with similarly relatively located areas on the surface 13 of the support medium 11. However, the size of a given box 50, for example, on the pattern sheet 41 ordinarily would be much smaller than the size of the corresponding area on the support medium 11. Each block 50, 50' has an identifying character therein, such as an alphanumeric character, and in the illustrated embodiment, a number in the box 50 or a number and a letter in the box 50'. The number 6 in box 50 identifies to the artist that a symbol that the artist may designate for the number 6 should be placed in the corresponding area or areas on the surface 13. Other boxes which also have the same designation, in this case the number 6, similarly would identify to the artist that at the corresponding area on surface 13 the same symbol as was applied at the first-mentioned area also should be applied; and so on for the symbol identified by the numeral 6. The number 5 in boxes 52, 53 would identify a different symbol selected by the artist intended to be applied to corresponding areas on the surface 13, and so on for the other indicia forming the pattern on the pattern sheet 41 of FIG. 5. Further indicia in the respective boxes in the pattern sheet 41, namely the letters "CGG" may be used to provide information identifying the particular pattern or design. In the illustrated embodiment of FIG. 5, the letters "CGG" may designate a pattern entitled "Coming And Going-Going".

EAch box 50', 52', 53', etc. in the pattern sheet 41' of FIG. 6, which is similar to sheet 41, includes both a number for the purpose identified above with respect to the pattern sheet 41, and a letter indicia. The letter is used to indicate direction, for example relative to the arrow indicator 29 on the support backing 22 on the appliator 20 (FIG. 3). Thus, the designation "6-U" in box 50' signifies to the artist that symbol No. 6 is to be applied to the corresponding area of the surface 13 with the arrow indicator 29 facing up; and the letter "D" in the box 50' indicates to the artist that symbols No. 5 is to be applied to the corresponding area of the surface 13 with the arrow 29 facing down. The letters "L" and "R" respectively indicate a one-fourth (90°) turn from vertical or the up direction of the applicator 20 either to the left (counterclokwise) or to the right (clockwise). In this way the use of letters adds a further dimension to the creativity achievable using the applicator pad 20 and support medium 11 in accordance with the invention. On the support medium 11 illustrated in FIG. 4, the four relatively rotated positions of a single symbols 12 formed by the circle 24 and line 25 on the applicator 20 (FIG. 2) are illustrated.

Ordinarily the pattern sheet 41 would include approximately ten different numbers (although fewer or more numbers may be employed depending on desired complexity of the composite picture 10 intended to be made). It is intended that the artist determine the form of a given symbol that would correspond to a given number, and the artist create that symbol. Thus, for example, the arrangement of the circle 24 and diagonal line 25 (FIG. 2) may be used as a symbol that the artist designates number "6". The artist may designate a U-shape symbol with the number "5" and still other symbols with different respective numbers. The color of the given symbol or the colors of various portions of a given symbol may be individually determined by the artist. After such symbol designation and color characteristics have been determined by the artist, the artist would apply appropriate color media to respective appliactors 20 and would use the applicators to apply the symbols to the surface 13 of the support medium 11 according to, for example, the pattern shown on a given pattern sheet 41, 41'. Alternatively, the artist may decide not to follow a given pattern on a furnished pattern sheet 41, 41' and may instead decide to use personal creative ability applying various symbols formed by respective color media on the support medium 11. Symmetry considerations may be employed during such free expression use in the invention.

Thus, it will be appreciated that the artist may create individual symbols and color combinations for use in creating the composite picture 10. Alternatively, the apparatus/kit of the invention may include a symbol sheet 60 (FIG. 7) having printed thereon a plurality of sample symbols 61 that could be used as a guide to enable the artist to form symbols on the applicator 20 without the need to exercise substantial independent creativity. The symbol sheet also may include exemplary color or color combination information or suggestions so that the artist need not independently determine what color of the color media 46, for example, would be used on each symbol or portion thereof.

A mofidied applicator 70 70 is illustrated in FIG. 8. The applicator 70 is substantially the same as the applicator 20 illustrated and described above with reference to FIGS. 2 and 3; however, the applicator 70 additionally includes a handle 71 protruding from and preferably attached to the top surface 28 of the support backing 22. The handle 71 is provided to facilitate manipulation of the applicator 70.

Although the preferred applicator 20 has a smooth or generally planar applying surface 23 for maximum versatility, as was described above, an alternative embodiment of applicator 80 shown in FIGS. 9 and 10 uses plural strips of applying material 81 (having characteristics similar to the applying material 21 in FIG. 2) cut out to form the desired configuration of a given symbol 12 and fastened to the support backing 22. As is seem in FIGS. 9 and 10, the applying material 81 is formed of three linear strips; they could be formed as a circle and a diagonal line like those designated 24, 25 in the applicator 20 of FIG. 2, or could be of still other shape, configuration, composition, etc., as may be desired. The kit 40 include a plurality of individual pieces of applying material 81 in a plurality of sizes and shapes and the artist may use the same to construct a desired symbol to form a given applicator 80. Alternatively, the artist may use a scissors, knife or other cutting instrument to cut desired shapes of applying material from a larger piece 82 thereof illustrated in FIG. 11. The applying material 82 preferably has an adhesive coating 83 on a surface thereof to facilitate attachement of a given part or all of the applying material to a support backing 22 ( FIG. 9). Modification of applicator 20 can also be made by using a knife, scissors or other instrument to cut out the desired symbol directly on the standard planar foam rubber ro cardboard applicator.

In using the invention to form composite pictures, the invention may be understood as a design method whereby alteration of any pad symbol from design to like design creates or results a in visible, perceptible change in color and conceptual application without changing the underlying basis design, e.g. represented by a given pattern or design on a pattern sheet 41, 41'. The design of each given symbol representation can be defined by the user and the color selection also can be independently determined in order to distinguish each particular pad symbol in a designated design of the overall composite picture. Symbols may vary slightly from one pad-like applicator to another e.g. varying according to how the artist may apply the color media to the given pad, by generally a common symbol would remain recognizable as representing an individual symbol design. To complete the basic design of a composite picture, all spaces labled and designated for a particular pad symbol, such ad those space on the support medium 11 which correspond to individual boxes 50, 50', in the respective pattern sheets 41, 41', must be filled in by the appropriate pad symbol. Various patterns ordinarily would be furnished in the apparatus/kit 40 and the artist also may develop personal patterns.

Preferably the applicators 20, in particular the applying surfaces 23 thereof, are either square or circular and the corresponding spaces on the surface 13 of the support medium 11 likewise preferably are square aranged in a rectilinear pattern corresponding to that laid out on a respective pattern sheet 41, for example. Alternatively, the spaces on the surface 13 may be triangular, circular, or other shape. Using square and circular pads any geometric figure, whether a line, dot, blot or other mark, can be formed and used as part of a symbol and then applied to the support medium surface 13. Turning any shaped pad through 360° while the same is in engagement with the surface 13 results in creating a circular symbol. A partial turn or spin of a pad create a partial curve, particular blur or blend of images, etc. applied to the surface 13. Moreover, the use of up, down, right and left positions relying, for example, on the arrow indicator 29 increases the number of variations on a theme that can be created by a given applicator and symbol thereon, increases versatility of the symbol and applicator, and allows for continuity and change in composition of any particular symbol in developing basic designs, for example as is represented in the fragmentary portion of the support medium 11 illustrated in FIG. 4 with the several rotated symbols shown.

An advantage to the use of circular applicators 20 with circular applying surfaces 23 is that the pads can be spun or pivoted around a center creating an accurate circular pattern or symbol; and partial turns of the circular pad will create curvilinear patterns for all points off center. Moreover, a circular pad could be used directly to apply a symbol creating a circle or any other pattern that may have been created on the circular pad. Direct application of a circular pad ordinarily would allow for greater texture of the color medium than would the spinning, pivoting or turning of an applicator around a center.

Texture means surface change or elevation after application of the color media by the pad to the surface 13 of the support medium. Ordinarily a relatively thick or viscous color medium applied or buttered onto an applicator 20 would result in a more textured application and result of color medium on the surface 13. However, relatively viscous color media will tend to come off the applicator easier than less viscous media and, thus, requires more frequent buttering/applying of color medium to the pad.

On the other hand, relatively non-viscous, water, wet or thin color media will run and will tend to spread outside their allocated space on the applying surface 23 of the applicator pad and/or on the surface 13 of the support medium. Thus, care should be taken, for example by not pushing the applicator too hard against the support medium surface 13, to avoid runs or drips. On the other, the applying material 21 will tend to retain a relatively large amount of thin color media in order to facilitate applying multiple symbols 12 to the surface 13 without having to re-butter or re-load the appliator pad with color media.

A single applicator pad 20 may be used to make several applications of symbols 12 to a support medium surface 13 without re-loading the applicator with color media. Additionally, an applicator pad 20 may be used to create a faint background of symbols or to create a background color, especially when using relatively thin, i,e, non-viscous, color media. Additional symbols may be applied over the background symbols or overall background-colored surface 13.

Ordinarily the first application of a color medie loaded applicator pad 20 to a surface 13 will apply the greatest amount of color media to the surface 13; and in sucessive uses of the same applicator pad without re-loading the same will apply correspondingly less color media to the surface 13. A test procedure can be used to determine degree of satisfaction with the amount of color medium being applied to a given area of the support medium surface 13 and is especially useful to evaluate the nature, characteristics, quality, brilliance, color combination, etc. of given symbols and color media used in the same. The test procedure may employ simply the applying of the given symbol using an applicator pad 20 to a test material that is the same as the support medium 11 in order to make the subjective evaluation. Moreover, using the test procedure, excess color medium can be removed and the next symbol formed actually directly on the support medium without re-loading the applicator ordinarily would more accurately approach the intended configuration of the particular symbol.

Two self-expression procedures may be used employing the invention to create a composite picture. In one approach. Referred to as free-form, there is virtually no limitation to the artist's self-expression in creating a given pad and where that pad and symbol created thereby would be applied to the support medium surface 13. In this case the artist may or may not choose to use a rectilinear grid structure for guiding positioning of respective symbols on the support medium surface 13. The aforementioned techniques of color media application to the support medium surface 13 may be used or, alternatively, a one-time use of a given pad symbol may be employed to produce unique, unreproduceable texture and/or color blend or mixture in the final composite picture which way or may not be filled with symbols across the surface thereof.

The other method of self-expression of the artist may be referred to as a symmetric rule approach. In this procedure the symmetric rule pre-supposes the use of an empty grip, for example a rectilinear grid. Symbols may be applied where the artist desires using vertical, horizontal, etc. symmetry. However, using the symmetric rule at least some form of symmetry, whether of the two or more axis type, should be employed.

In applying the symmetric rule, each application of a symbol to the developing design, must be complemented by another application to one of the three complementary positions in the sheme of the design. This is most easily understood by example. Assume that one chooses the upper left hand corner for application of the chosen or created pad symbol, then at least one or all (but in multiples of 2) of the locations to choose from for the next application would include the upper right hand corner, the lower left hand and the lower right hand corners. Obviously if any of these complementry pairs already has been chosen in the developing of ht symmetricrule design, then the number of choices for a paticular complementary application is reduced by two.

It has been found that the second through the fouth application of a pad symbol to a developing design serve the best purpose in developing the basic design and avoiding overemphasis on the individual or particular pad symbol. There are several reasons for this. First, as already mentioned, excess and unwanted color medium will be removed and, therefore, the pad symbol will be more accurately representative of the original symbol as was placed on the pad. Second, as more and more color medium is used up by repeated applications of the pad, less and less color medium will be delivered to the surface medium. The integrithy, clarity, sharpness, unformity (in texture and color) and distinctions of a particular pad symbol will diminish, requiring the need to butter-up the pad with additional color medium.

According to the preferred embodiment and best mode of the invention, then, it is desirable to fill all spaces on the surface 13 of a given support medium with appropriate pad symbols 12.

STATEMENT OF INDUSTRIAL APPLICATION

In view of the foregoing it will be appreciated that the invention provides a method and apparatus for creating composite pictures using various levels of aartistic creativity.

We claim:

1. A kit for making a composite picture of plural symbols according to a prescribed pattern and without restriction to colors or symbols, comprising a surface medium on which the composite picture is to be made, plural pad-like application means for applying color media to said surface medium to form respective symbols thereon creating such composite picture, said application means including symbol means for forming the shape of a respective symbol, each of a plurality of said application means having a different respective symbol means for forming different respective shapes by said respective application means, and said symbol means including surface means for holding color media and for applying such color media to said surface medium in the shape formed by said symbol means, and indicia pattern means for identifying locations on said surface medium, said indicia pattern means including indicia identifying means in a pattern design for relatively identifying the application means and symbol means for applying color media to respective identified locations on said surface medium to form respective symbols thereon to create such composite picture, whereby said indicia pattern means defines placement of symbols on said surface medium to complete a specific composite picture design thereon while permitting creativity in the selection of respective symbols and colors for correspondence with said identifying means of said indicia pattern means.

2. The kit of claim 1, said surface medium comprising a canvas or linen material.

3. The kit of claim 1, said indicia pattern means comprising a plurality of respective sheets, each having a different respective pattern design of indicia identifying means thereon.

4. The kit of claim 1, said indicia pattern means includign information concerning the direction of application of such symbols to said surface medium.

5. The kit of claim 1, further comprising a symbol sample sheet identifying sample symbols for use in creating the composite picture.

6. The kit of claim 1, said application means comprising a support backing, and said symbol means and said supports backing being coupled together as an integral structure.

7. The kit of claim 6, said symbol means comprising a sponge and said surface means comprising a surface of said sponge.

8. The kit of claim 6, said symbol means comprising rubber.

9. The kit of claim 8, said rubber comprising foam rubber.

10. The kit of claim 6, said support backing including holder means for facilitating manula grasping of said application means, said holder means comprising relatively rigid material and said symbol means comprising relatively resilient material.

11. The kit of claim 10, said holder means support backing comprising cardboard material.

12. The kit of claim 6, said symbol mean and being substantialy coextensive and being non-overlapping beyond the extent of the other.

13. The kit of claim 10, said symbol means comprising resilient material having adhesive means for attaching the same to said holder mean.

14. The kit of claim 6, said symbol means comprising preformed material for defining a pattern of relatively raised surface areas on surface means for applying color media to said surface medium.

15. The kit of claim 6, further comprising means on said application means for designtng directional orientation of the application means.

16. The kit of claim 1, said appliction means comprising a holder and said symbol means comprising an applicator pad, said applicatior pad having a fastening surface means for fastening said applicator pad with respect to said holder, said holder a first surface to which said fastening surface is fastened.

17. The kit of claim 16, wherein said applicator pad and holder are substantially coextensive to minimize the possibility of said holder first surface receiving or applying color media.

18. The kit of claim 16, wherein said applicator pad covers substantially the entire first surface of said holder.

19. The kit of claim 13, wherein said identifying means includes directional orientatio information for said application means as part of the pattern design.

20. The invention of claim 1, said surface medium further comprising rectilinear grid means thereon for facilitating the aligning of individual application means to apply respective symbols respective location on said surface medium.

21. The kit of claim 20, wherein the locations identified by said indicia pattern means correspond substantially indentically with respective locations identified by said rectilinear grid means on said surface medium.

* * * * *